United States Patent
Wieczorek et al.

(10) Patent No.: US 8,551,335 B2
(45) Date of Patent: Oct. 8, 2013

(54) DUAL STAGE FILTRATION WITH BARRIER FOR FUEL WATER SEPARATION

(75) Inventors: Mark T. Wieczorek, Cookeville, TN (US); Arnaud LeVen, Ergué-Gabéric (FR); Jean-Luc Guichaoua, Combrit (FR); Jean-Yves Picard, Quimper (FR); Gerard Malgorn, Quimper (FR); Terry W Shults, Cookeville, TN (US); Barry M. Verdegan, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 439 days.

(21) Appl. No.: 12/832,729

(22) Filed: Jul. 8, 2010

(65) Prior Publication Data
US 2011/0006017 A1      Jan. 13, 2011

Related U.S. Application Data

(60) Provisional application No. 61/224,014, filed on Jul. 8, 2009.

(51) Int. Cl.
| | |
|---|---|
| *B01D 35/22* | (2006.01) |
| *B01D 35/16* | (2006.01) |
| *B01D 24/00* | (2006.01) |
| *B01D 25/00* | (2006.01) |
| *B01D 27/00* | (2006.01) |
| *B01D 29/00* | (2006.01) |
| *B01D 33/00* | (2006.01) |
| *B01D 21/00* | (2006.01) |
| *B01D 24/48* | (2006.01) |
| *B01D 29/60* | (2006.01) |
| *B01D 33/70* | (2006.01) |
| *B01D 43/00* | (2006.01) |
| *B01D 35/00* | (2006.01) |

(52) U.S. Cl.
USPC .......... 210/338; 210/300; 210/301; 210/305; 210/315; 210/337; 210/458

(58) Field of Classification Search
USPC .......... 210/300, 301, 305, 338, 339, 799, 806
See application file for complete search history.

(56) References Cited

U.S. PATENT DOCUMENTS 4,588,500 A * 5/1986 Sprenger et al. .............. 210/100
2005/0258092 A1* 11/2005 Mertens et al. ............... 210/483
(Continued)

FOREIGN PATENT DOCUMENTS

| CA | 963400 | * | 2/1975 |
| DE | 102 33 475 | | 2/2004 |
(Continued)

OTHER PUBLICATIONS

International Search Report for international application No. PCT/US2010/041405, dated Oct. 21, 2010 (4 pages).
(Continued)

*Primary Examiner* — Nam Nguyen
*Assistant Examiner* — Clare Perrin
(74) *Attorney, Agent, or Firm* — Hamre, Schumann, Mueller & Larson, P.C.

(57) ABSTRACT

A dual stage filter includes an outer filter with a first media and an inner filter with a second media. A barrier is between the first media and the second media. The barrier directs fluid flow between the first and second media. The barrier creates a flow path between the first and second media, such that a working fluid, which is desired to pass through the first and second media, is directed by the barrier and flows through the second media, and such that another fluid, which is not desired to pass through the second media, is directed by the barrier and separates from the working fluid. Using the barrier, the dual stage filter can employ either or both upward flow and downward flow to achieve efficient fluid separation, for example fuel water separation in an engine fuel filter.

16 Claims, 12 Drawing Sheets

(56) References Cited

U.S. PATENT DOCUMENTS

| | | | |
|---|---|---|---|
| 2006/0027510 A1* | 2/2006 | Rassinger | 210/790 |
| 2006/0191832 A1* | 8/2006 | Richie et al. | 210/171 |
| 2010/0101984 A1* | 4/2010 | Roesgen et al. | 210/86 |

FOREIGN PATENT DOCUMENTS

| | | |
|---|---|---|
| DE | 20 2006 019 301 | 4/2008 |
| DE | 202006019301 U1 * | 4/2008 |
| DE | 20 2008 001 534 | 6/2009 |
| EP | 1124056 | 8/2001 |
| EP | 1124056 A2 * | 8/2001 |
| WO | 01/91881 | 12/2001 |
| WO | 2007/041559 | 4/2007 |
| WO | 2009/095339 | 8/2009 |

OTHER PUBLICATIONS

Written Opinion of the International Searching Authority for international application No. PCT/US2010/041405, dated Oct. 21, 2010 (8 pages).

* cited by examiner

Fig. 14

DUAL STAGE FILTRATION WITH BARRIER FOR FUEL WATER SEPARATION

This application claims the benefit of U.S. Provisional Application Ser. No. 61/224,014, filed on Jul. 8, 2009, and titled "Dual Stage Filter Cartridge for Fuel Water Separation", the entirety of which is incorporated by reference herewith.

FIELD

The disclosure herein generally relates to dual stage filtration. More particularly, the disclosure herein relates to dual stage filters employing a barrier that is useful for fuel water separation.

BACKGROUND

Improvements may be made upon existing designs employing dual stage filtration media. More particularly, improvements may be made upon existing dual stage filters used for instance, in fuel water separation, such as for example in various fuel systems of engines.

SUMMARY

Generally, an improved dual stage filter is described that has a barrier structure that can be useful to separate an undesired fluid from a desired working fluid. For example, the dual stage filter described herein can be useful in applications such as fuel water separation in engine fuel filtration systems. It will be appreciated that the dual stage filter may be useful in applications other than fuel water separation, for example where there is a need to separate a working fluid from other contaminants or undesired fluids.

The dual stage filter as shown and described herein can improve filtration capabilities, for example in fuel water separation applications.

In one embodiment, a dual stage filter is a cartridge-like structure for assembly with a housing (or shell) and standpipe as known for instance in fuel filtration systems. The dual stage filter cartridge includes an outer filter with a first media and an inner filter with a second media. A barrier is between the first media and the second media. The barrier directs fluid flow between the first and second media. The barrier creates a flow path between the first and second media, such that a working fluid, which is desired to pass through the first and second media, is directed by the barrier and flows through the second media, and such that another fluid, which is not desired to pass through the second media, is directed by the barrier and separates from the working fluid. Using the barrier, the dual stage filter cartridge can employ either or both upward flow and downward flow to achieve efficient fluid separation, for example fuel water separation in an engine fuel filter.

In some embodiments, the barrier includes a wall that extends below the outer filter.

In some embodiments, the barrier includes a wall that flares toward and below the outer filter.

In some embodiments, the barrier includes a wall with a textured surface.

In some embodiments, the barrier includes a spiraling flange on a surface of the barrier that faces that outer filter. In some embodiments, the spiraling flange is a component that may be separately assembled with the barrier.

In some embodiments, the inner filter includes an additional barrier portion above the second media. In some embodiments, the additional barrier portion includes a spiraling flange facing the barrier, which provides another flow assist with centrifugal force for added separation.

In some embodiments, additional media is within a gap between the outer filter and the barrier, and/or additional media is within a gap between the barrier and inner filter. In one embodiment the additional media are proximate the bottom of the filter cartridge.

In one embodiment, a method of separating water from fuel in a dual stage liquid filtration includes moving a mixture including fuel and water through a first media. The mixture is contacted against a barrier. The mixture is directed around the barrier, such that directing the mixture includes changing the flow of the mixture, thereby separating water from fuel. The mixture is then moved to a second media, and additional water that may be present in the mixture is stripped from the fuel.

BRIEF DESCRIPTION OF THE DRAWINGS

The drawings herein show and provide description as to various inventive concepts of a dual stage filtration cartridge.

DETAILED DESCRIPTION

FIGS. 1-14 and the following descriptions show and describe an exemplary embodiment of a dual stage filter. Generally, an improved dual stage filter is described that has a barrier structure that can be useful to separate an undesired fluid from a desired working fluid. For example, the dual stage filter described herein can be useful in applications such as fuel water separation in engine fuel filtration systems, for instance where fuel is the working fluid and water is the fluid to be separated. It will be appreciated that the dual stage filter may be useful in applications other than fuel water separation, for example where there is a need to separate a working fluid from other contaminants or undesired fluids.

The dual stage filter as shown and described herein can improve filtration capabilities, for example fuel water separation capability in fuel filtration applications. The dual stage filter is depicted and described as a cartridge-like structure that can be assembled, for example with a housing (or shell) and standpipe, such as known for instance in engine fuel filtration systems (housing and standpipe not shown). It will be appreciated that the dual stage filter may be constructed in ways other than as a replaceable cartridge used with known housing and standpipe structures.

Figure 1:
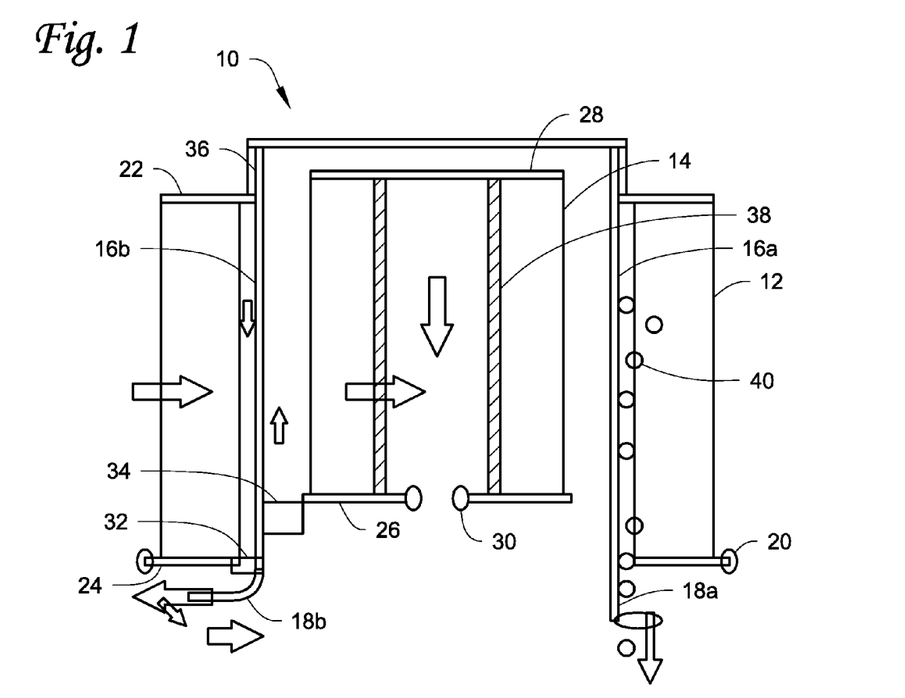
FIG. 1 is a sectional view of a filter cartridge having dual stage media filtration, and showing multiple embodiments of a barrier that directs fluid flow between dual stage media.

With reference to FIG. 1, a dual stage filter cartridge 10 includes an outer filter with a first media 12 and an inner filter with a second media 14. As shown, the inner filter is disposed within the outer filter, and the filters can be arranged in a concentric filter in filter arrangement, such as known. The outer filter includes endplates 22 and 24, shown as top and bottom endplates respectively. Likewise, the inner filter has endplates 28 and 26, shown as top and bottom endplates respectively, and may include a center tube 38 for added support.

In some embodiments, the outer and inner filters are connected together. The outer and inner filters can be connected using various known constructions and arrangements as appropriate, such as for example, using a press fit, a snap fit, a weld, or the like.

As shown, the top endplate 22 of the outer filter has a stepped construction so that the first and second media can be at different heights. It will be appreciated that the endplate 22 can be constructed without a step, and may be constructed to have the same height throughout.

Each of the outer filter and inner filter includes a seal 20, 30. Seal 20 is used to seal the outer filter, for example to a filter housing shell. Seal 30 is used to seal the outer filter, for example to a standpipe for clean or "dry" fluid (e.g. fuel) to exit the filter.

With respect to the first and second media, the following is with reference to media used in fuel water separation filtration. It will be appreciated that other media may be employed, for example, in applications other than fuel water separation.

With reference to fuel water separation, the first media of the outer filter is constructed for example of a coalescing media. Generally, the coalescing media is able to capture drops in the 1-20 micron size range, where such media could be polyester, nylon, or other suitable material as appropriate. The coalescing media (or coalescer) can cause water to separate from a mixture including fuel and water and coalesce to sizes of about 1-2 mm droplets, and sometimes for example as high as about 4 mm.

Generally, the second media of the inner filter is constructed for example of a fine particulate filtration media. In many instances, the second media generally includes a hydrophobic material and is typically not as tight as the first media. The fine particulate filtration media acts as a stripper that can remove particulate and matter that is sized at about 0.5 mm and smaller, and also sizes at about 50 micron. The second media helps remove such particulate and matter that may not have been removed by the first media. In one embodiment, the second media includes a hydrophobic material. It will be appreciated that the above description of the first and second media is not intended to be limitative, and that where appropriate the type of material may be modified as desired and/or needed to achieve the desired coalescing and particulate filtration effects.

With further reference to FIG. 1, a barrier (16a or 16b) is between the first media 12 and the second media 14. The barriers 16a, 16b represent two barrier types for different embodiments. Differences between barriers 16a, 16b are further described below.

Generally, the barriers shown and described herein are disposed in a space between the first media and second media and are concentric with the outer and inner filters. The barrier directs fluid flow between the first and second media. The barrier creates a flow path between the first and second media, such that a working fluid (e.g. fuel), which is desired to pass through the first and second media is directed by the barrier and flows through the second media, and such that another fluid (e.g. water), which is not desired to pass through the second media, is directed by the barrier and separates from the working fluid. As shown in the drawings, the barrier and outer filter are constructed and arranged so as to prevent bypass of the flow path created by the barrier. That is, the barrier and outer filter are arranged such that the upstream mixture of fluids (e.g. contaminated fluids) does not proceed to the inner filter without first being directed by the barrier. Using the barrier, the dual stage filter cartridge can employ either or both upward flow and downward fluid flow to achieve efficient fluid separation, for example fuel water separation in an engine fuel filter.

With further reference to FIG. 1, the barriers 16a, 16b provide separate embodiments of a flow assisting structure, for example, that can help improve fuel water separation performance of a dual stage media filter, such as for example in a "filter in filter" arrangement. The barrier (16a or 16b) is placed between the first media 12 and second media 14. Generally, the barrier (16a or 16b) provides a flow path that directs a mixture including fuel and water to make a significant change in direction. The change in direction creates a low velocity area that allows water to separate from the fuel. In FIG. 1, the flow path includes a change in direction, for example that causes fluid to flow opposite the direction of gravity.

As shown, FIG. 1 depicts two different barrier geometries (16a or 16b). Either barrier is substantially sealed to one of the top endplates, such that no or minimal bypass of the barrier is allowed. As shown, the barrier is sealed to the top endplate 22 of the outer filter, such as at area 36. A hermetic seal may be used, but is not necessarily required, as minimal leakage may occur and may be allowed without damaging the function of the filter 10.

With specific reference to barrier 16a, the right side of FIG. 1 shows barrier 16a as a vertical barrier, where the flow path travels straight down to the bottom 18a of the barrier and then reverses direction, approximately 180° opposite gravity toward the second media 14. As shown, the barrier 16a, including the bottom 18a, is constructed as a vertical wall. Below the bottom 18a, water that has coalesced into droplets 40, after passing through the first media 12, are allowed to settle or separate out of the flow path. Water passing through the first media 12 can also contact the barrier 16a or entrain on the barrier 16a and further coalesce to form more droplets 40 or larger droplets. Fuel flowing at a higher velocity and having lower density relative to the water droplets is allowed to continue on the flow path to the second media 14.

That is, as the fuel and coalesced water droplets 40 flow around the barrier 16a, the greater inertia of the more dense water phase, in combination with gravitational forces, separates the water from the fuel flow. The water can be collected, for example in a sump (not shown), which can be located below the barrier 16a. It will be appreciated that sumps are well known and not further described.

FIG. 1 shows the first media 12 as a first stage coalescer. The barrier 16a changes the direction of fluid flow, such that water and water droplets tend to stay in a low velocity zone and fall out of the flow path (e.g. into a water sump), and fuel continues to the second media 14 or stage 2 particulate filtration, and further water removal (if needed). The barrier 16a provides a wall that the fluid flow would impact as it exits the first stage coalescer. Water can collect on the wall, coalesce, separate from the fuel, and may drain out of the filter (e.g. into a sump).

With further reference to the barrier 16a, it will be appreciated that the barrier 16a may be constructed as a tube-like element that is placed between the concentric arrangement of the first and second media 12, 14. It also will be appreciated that, if barrier 16a is employed, the filter 10 at the left side of FIG. 1 would not have the flare of barrier 16b (described below). Rather, the tube would have a generally vertical wall from top to bottom, and reside in the space between the first and second media 12, 14.

With further reference to the barrier 16a, the height of the wall in some embodiments is about the same as a height of the outer filter. In some embodiments, such as shown in FIG. 1, the barrier 16a includes a wall that extends below the outer filter. That is, the barrier 16a could be a thin tube, extending from the top endplate 22, to just below the lower endplate 24. In some embodiments, the barrier 16a can extend about 0.25 to about 0.5 inches below the lower endplate 24 of the outer filter.

It will be appreciated that the distance that the barrier 16a extends beyond the lower endplate 24 can be limited by other design constraints. For example, in a filtration module having a sump or collection reservoir (not shown), re-entrainment of water may be an issue, if the barrier 16a extends too close to a sump, i.e. too far below the bottom endplate 24. Thus, it is desired in some embodiments, that the barrier 16a does not extend far enough, such that collected fluid could rise to a level that would allow fluid to re-entrain back up the barrier 16a. That is, a design of the barrier 16a is such that it does not get too close to such a level of collected fluid, for example so that re-entrainment issues are avoided.

It will also be appreciated that the barrier 16a can be shorter if desired and/or necessary, for example by about 3 mm.

As long as the gap between the wall of the barrier 16a and the first media 12 is large enough for water droplets to form and separate from the fuel, the height of the barrier 16a may be altered as needed and/or desired to further facilitate separation. A gap should be sized so that droplets of about 1-2 mm in diameter and sometimes up to 4 mm in diameter can be accommodated and allowed to drain. In some embodiments, the gap between first media 12 of the outer filter and the wall of the barrier 16a is approximately 3-4 mm, so that coalescing can occur and droplets may form. With respect to the gap between the inner diameter of the barrier 16a and the second media 14 of the inner filter, the gap may be similarly sized as the gap between the first media 12 and wall of the barrier 16a. It will be appreciated that since smaller droplets tend to be present at this stage in the flow path, the gap could be smaller than if appropriate.

With specific reference to barrier 16b, a vertical wall has a bottom 18b that flares out toward and below the outer filter. As with barrier 16a, barrier 16b shows the first media 12 as a first stage coalescer. The barrier 16b provides further changes to the direction of fluid flow, such that water and water droplets tend to stay in a low velocity zone and fall out of the flow path (e.g. into a water sump), and fuel continues to the second media 14, where further particulate filtration and water removal can occur (if needed). The barrier 16b provides a wall that the fluid flow would impact as it exits the first stage coalescer. Water can collect on the wall, coalesce, separate from the fuel, and may drain into a water sump. Water passing through the first media 12 can also contact the barrier 16b or entrain on the barrier 16b and further coalesce to form more droplets 40 or larger droplets. Fuel flowing at a higher velocity and having lower density relative to the water droplets is allowed to continue on the flow path to the second media 14.

As with barrier 16a, it will be appreciated that the barrier 16b may be constructed as a tube-like element that is placed between the concentric arrangement of the first and second media 12, 14. It also will be appreciated that, if barrier 16b is employed, the filter 10 at the left side of FIG. 1 would not have the barrier 16a. With respect to the height and gap considerations, similar heights and gaps may be employed as with barrier 16a, while avoiding re-entrainment and accommodating size of coalesced droplets. The flared bottom 18b is further described as follows.

At the left of FIG. 1, the barrier 16b is structured as a vertical wall that includes a bottom 18b that flares out below the outer filter, e.g. stage 1 coalescer. The flared bottom 18b creates a point where fluid flow reversal occurs that is larger in circumference, thereby reducing velocity of the fluid flow. The flared bottom 18b provides a change in velocity, due to the increase in circumference at the flared bottom 18b, and change of direction. In some embodiments, the change in flow direction is about 180 degrees (see flow arrows around flared bottom 18b). Such a direction change can further promote drainage of entrained water on the barrier to separate from the fuel (e.g. and collect into a sump).

Use of the flared bottom 18b can further help reduce water collection on the second media 14, e.g. stage 2 particulate filtration media. As shown, the direction change is a flare out that can slow the velocity of water and water droplets relative to the fuel, so as to allow water and water droplets to separate from the fuel. FIG. 1 shows two direction changes, one around the flared bottom 18b and another ultimately around the barrier 16b (e.g. use of gravity). Such a configuration can provide two water exits, one at the velocity change of the flared bottom 18b, and another by use of gravity (e.g. upward flow) around the barrier 16b.

With further reference to the flared bottom 18b, the flare may be constructed to be about 4-6 mm from a housing or shell wall, so as to allow large enough droplets to fall out at the direction change. As shown, the flared bottom 18b has a radius where it turns from the vertical portion of the barrier 16b and increases in circumference toward the outer filter. The radius may be constructed so as to make for a smooth and somewhat gradual transition from the vertical wall of the barrier 16b1 to along the flared bottom 18b. Such a structure can help reduce cross sectional fluid flow and eddy currents.

With further reference to FIG. 1, some embodiments may employ additional media to help further separate water from the fuel. In one embodiment, additional media 32 is disposed within a gap between the first media 12 of the outer filter and barrier (16a or 16b). In another embodiment, additional media 34 is disposed within a gap between the barrier (16a or 16b) and the second media 14 of the inner filter. In one embodiment, media 32 is a coalescing media. In one embodiment, media 34 is a hydrophobic screen.

In one example, both media 32, 34 are located proximate a bottom of the filter cartridge. It will be appreciated that media 32, 34, may be positioned at other locations if appropriate. It will be appreciated that media 32, 34 can take on various forms. For example, either or both of media 32, 34 may be constructed as a sheet or layer of media, or as a wadding of material, or more generally an element having some depth.

The specific configuration of the media 32, 34 may be modified as desired and/or needed and the above is not meant to be limiting.

It will be appreciated that either or both media 32, 34 may be employed with either barrier 16a or 16b. For ease of illustration only, media 32, 34 are shown with respect to barrier 16b, but it will be appreciated that the media 32, 34 can be present on the right side of FIG. 1. For example, the media 32, 34 can be concentrically arranged with respect to being between the barrier and the outer filter (e.g. media 32) or being between the barrier and the inner filter (e.g. media 34).

With further reference to outer seal 20, which seals the outer filter for instance to a filter housing or shell, the outer seal 20 can also be composed of a media allowing water separation. For example, rather than being composed of a general fluid seal, seal 20 can be an element composed of additional media disposed on an outer diameter of the bottom endplate 24 of the outer filter. The media would be configured to separate an undesired fluid (e.g. water) that does not flow through the outer filter, from a desired fluid (e.g. fuel).

Figure 2A:
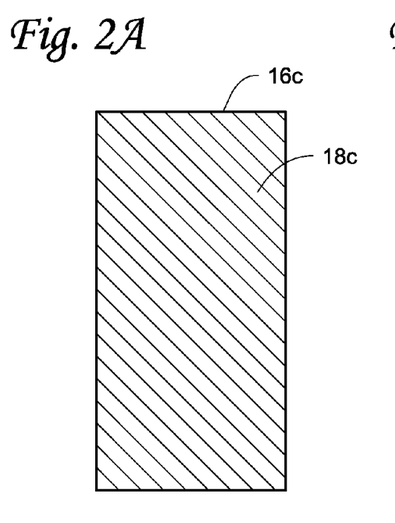
FIG. 2A is a side view of one embodiment of the wall structure for a barrier that may be used in the filter cartridges herein, for example the filter cartridge of FIG. 1.
Figure 2B:
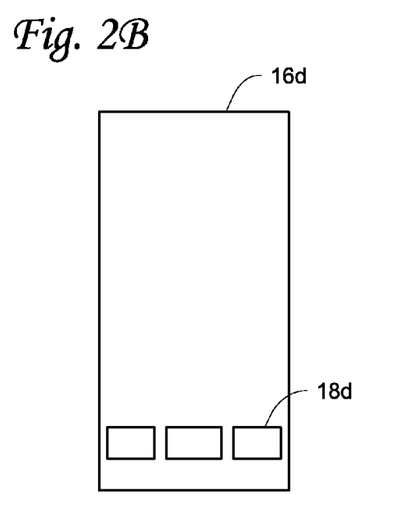
FIG. 2B is a side view of another embodiment of the wall structure for a barrier that may be used in the filter cartridges herein, for example the filter cartridge of FIG. 1.
Figure 3:
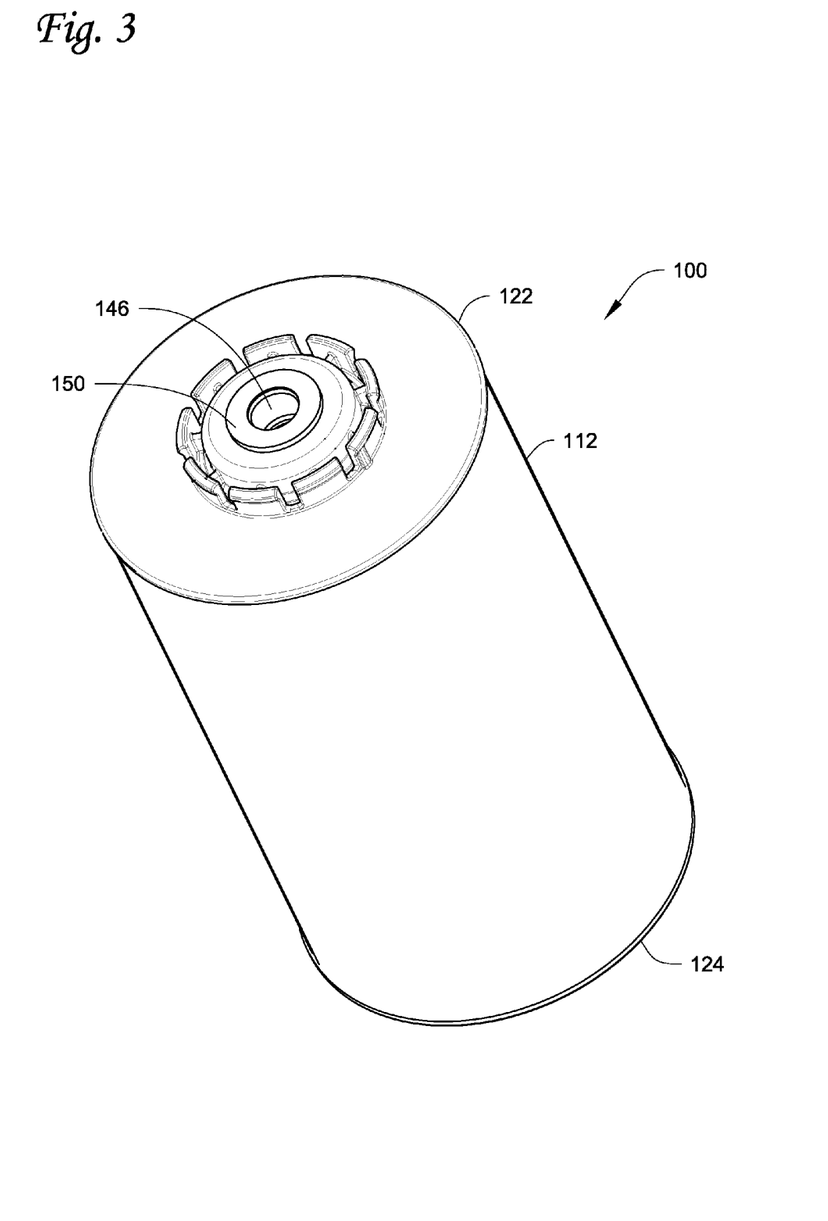
FIG. 3 is perspective view showing the outside of another embodiment of a filter cartridge having dual stage media filtration.

With reference to FIGS. 2A and 2B, the barrier can take on various other implementations, which may be applicable to the filter 10. In the embodiments of FIG. 1, the barrier is shown as tube with a smooth surface tube. In other embodiments, the barrier may be constructed to have a wall that is textured on a surface of the barrier that faces the outer filter.

As shown in FIG. 2A, for example, the barrier 16c has a textured surface with a spiraled flange 18c. The spiraled flange can provide support and further drainage capability. For example, the spirals can extend outward from the wall and come close to or in soft contact with the inner diameter of the outer filter, e.g. first media 12. Such a configuration provides support of the outer filter, while the spiraling geometry simultaneously helps to direct fuel/water toward the bottom for separation. The spacing of the spirals would be constructed so as not to impede fluid flow. In some examples, the spacing may be about 5 to 6 mm, so as to allow a spacing to accommodate coalesced droplet sizes.

It will be appreciated that the spiraled flange 18c can be molded onto the tube into or formed on the barrier 16c (e.g. tube). For example, the spiraled flange 18c may be formed using, for instance, a clam shell mold.

In some embodiments, the spiraled flange 18c is a component separately assembled onto the outer surface of the barrier 16c. For example, the spiraled flange 18c is a 'free state' flexible spiral flow component that may resemble a wound spring inserted into filter. In some assembly situations, such a construction may be particularly desirable or appropriate in combination where the seal (e.g. seal 20) of the outer filter element is composed of a coalescing media. For example, a separate spiral flow component could be loaded at the top of the filter between the outer and inner filters, along with a felt media (e.g. seal 20) between the housing and outer filter.

It will be appreciated that the texture of the barrier is not limited to a spiraled flange. In other circumstances, where appropriate or desired, the barrier facing the inner diameter of the first media may or may not be textured as appropriate. Rather than the spiral configuration 18c, or even in addition to, the barrier can have nano-bumps and/or a combination of at least one hydrophobic portion, and at least one hydrophilic portion to further aid in water droplet coalescence.

FIG. 2B shows another barrier 16d. The barrier 16d includes a wall with openings 18d proximate a bottom end. Such a barrier could be placed between the outer and inner filters, such as in a filter-in-a-filter two stage coalescer. In some embodiments, the barrier 16d is permanent and reusable. The barrier 16d may be mountable to a filter housing or shell, such as from the bottom but above any collection reservoir, and extend upward between the inner and outer filters. The bottom of the barrier includes openings 18d to facilitate fluid flow through and around the barrier 16d. It will be appreciated that, as with the other barriers described, barrier 16d can be constructed to extend to the top endplate, or as close as practical within tolerances of the filter design.

Other modifications of the general filter cartridge structure shown in FIG. 1 may also be employed. For example, the top endplates 22, 28 may be combined into a single endplate to reduce processing & component costs. Also, the barrier tube may also be molded into the endplate (e.g. endplate 22) to further reduce the number of components.

With reference to FIGS. 3-11, another embodiment of dual stage filter cartridge 100 is illustrated. Generally, the barrier 116 shown includes a spiraling flange 118 disposed on a surface of the barrier 116 facing the first media 112 of the outer filter. In some embodiments, the spiraling flange 118 is close to/in contact with an inner diameter of the first media 112 and supports the outer filter.

With reference to the general structure of dual stage filter cartridge 100, many structures employed in filter cartridge 10 are similar to the cartridge 100 and are briefly described as follows. Filter cartridge 100 includes an outer filter having the first media 112 and an inner filter or second stage media member 114. The second stage media member 114 has a main body 128 and a second media 126. As shown, the inner filter is disposed within the outer filter, and the filters can be arranged in a concentric filter in filter arrangement, such as known. The outer filter includes endplates 122 and 124, shown as top and bottom endplates respectively. The second stage media member 114, however, has a main body 128 with openings including the second media 126. In the embodiment shown, the top end of the cartridge 100 includes a relatively small opening 146 and seal 150, for example, to provide a pressure release/additional valve capability. In the embodiment shown, flow of filtered fluid is through main outlet 132, which is shown at the bottom of the cartridge 100.

Figure 4:
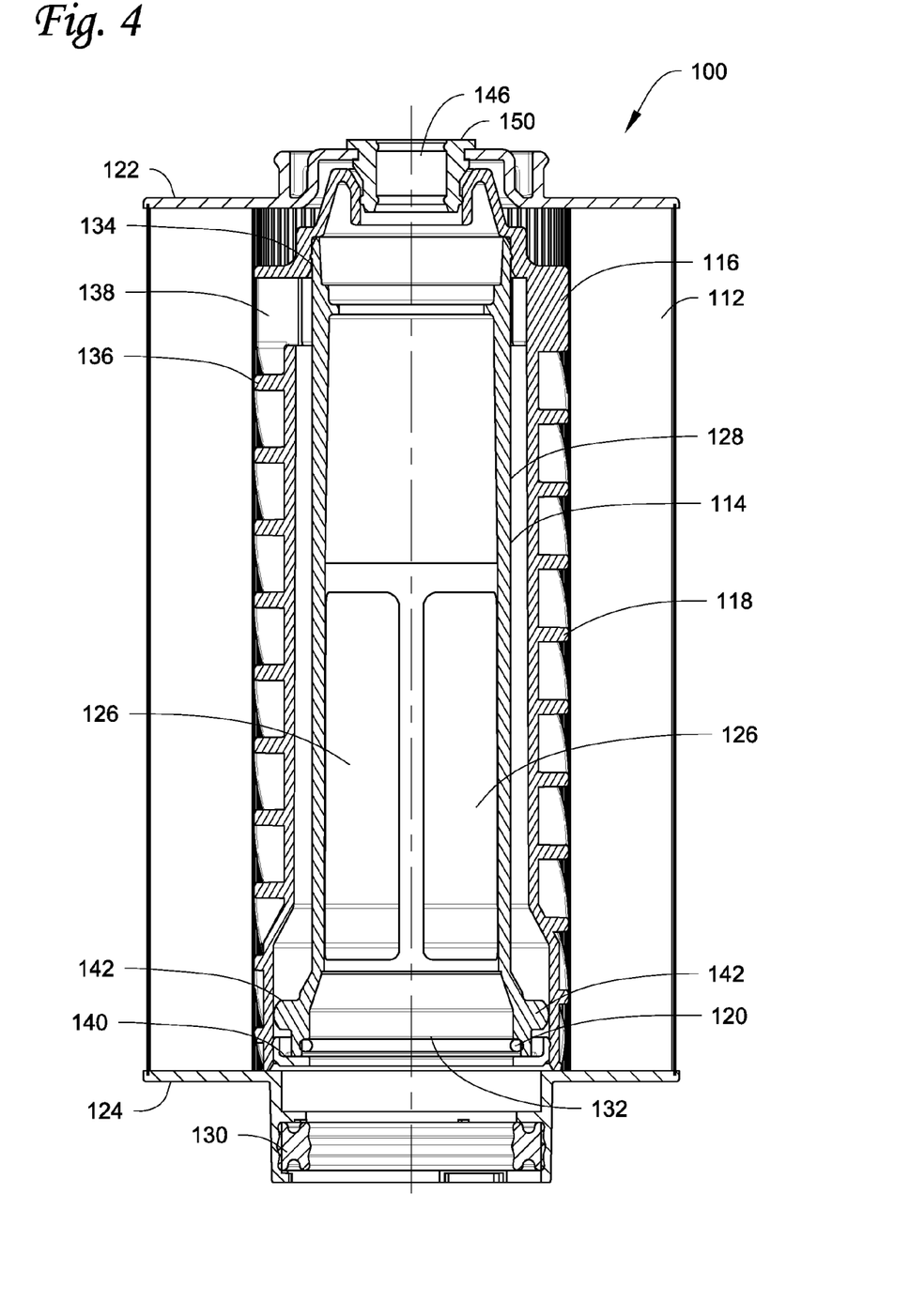
FIG. 4 is a sectional view of the filter cartridge of FIG. 3 showing another embodiment of a barrier that directs fluid flow between the dual stage media.
Figure 5:
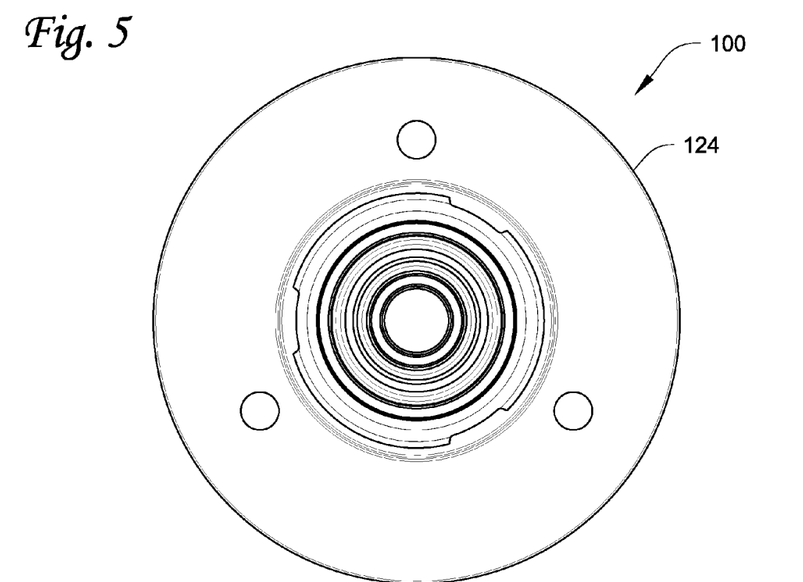
FIG. 5 is a bottom view of the filter cartridge of FIG. 3.
Figure 6:
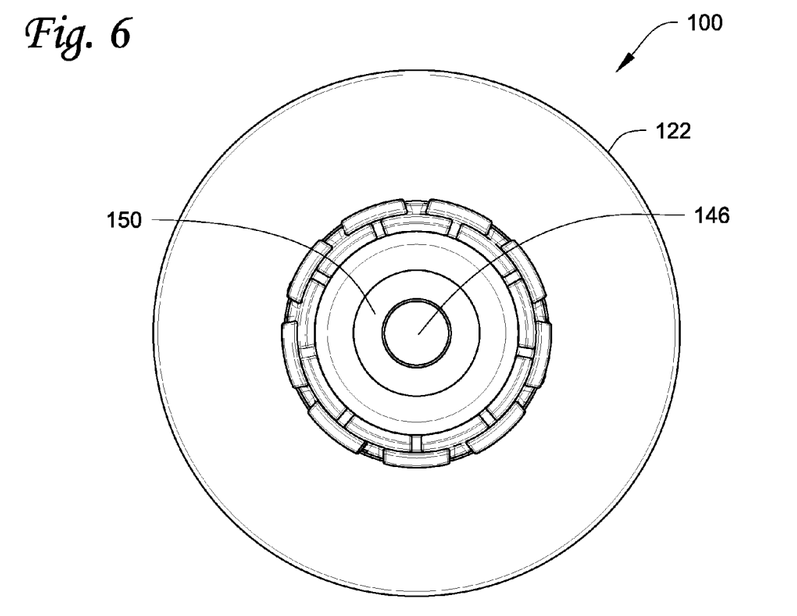
FIG. 6 is a top view of the filter cartridge of FIG. 3.

Each of the outer filter and inner filter includes a seal 120, 130. In one embodiment, seal 120 is used to seal the second stage media member 114, for example to a standpipe for clean or "dry" fluid (e.g. fuel) to exit the filter without being contaminated. In one embodiment, seal 130 is used to seal, for example to a portion of a standpipe dedicated to drainage of undesired fluids (e.g. water).

With respect to the first and second media 112, 126, the following is with reference to media that may be used in fuel water separation filtration. It will be appreciated that other media may be employed, for example, in applications other than fuel water separation. The first media 112 is constructed for example of a coalescing media. The coalescing media (or coalescer) can cause water to separate from a mixture including fuel and water and coalesce to sizes of about 1-2 mm droplets, and sometimes for example as high as about 4 mm. The second media 126 is constructed for example of a fine particulate filtration media. The fine particulate filtration media acts as a stripper that can remove particulate and matter that is sized at about 0.5 mm and smaller, and also sizes at about 50 micron. The second media 126 helps remove such particulate and matter that may not have been removed by the first media. In one embodiment, the second media 126 includes a hydrophobic material, which may be composed as a hydrophobic screen.

As with the barriers described above, the barrier 116 is disposed in a space between the first media 112 and second media 126 and is concentric with the outer and inner filters. The barrier 116 directs fluid flow between the first and second media 112, 126. The barrier 116 creates a flow path between the first and second media 112, 126, such that a working fluid (e.g. fuel), which is desired to pass through the first and second media is directed by the barrier and flows through the second media, and such that another fluid (e.g. water), which is not desired to pass through the second media, is directed by the barrier and separates from the working fluid. As shown in the drawings, use of the barrier 116 employs an upward flow to achieve efficient fluid separation.

As shown in FIG. 4, the barrier 116 is structured, for example as a center tube between the outer and inner filters. The center tube has a spiraled flange 118 creating a flow path that directs fluid flow upward to the top. The swirl movement caused by the spiraled flange 118 helps to separate water from the fuel. Openings 138 at the top of the barrier 116 and spiraled flange 118, allow fluid flow through the barrier 116. Gravity can then be used, after the mixture of water and fuel passes through the openings 138, to separate water from the fuel as the mixture flows down between the barrier 116 and inner filter body 128. The inner filter body 128 also acts an additional barrier portion, which for example can provide more time to allow for water separation before the fluid flow reaches the second media 126.

With further reference to the embodiment shown, the first media can be a pleated first stage media suitable for coalescing. The barrier 116 with its spiraled flange 118 is structured, for example, as a helicoidal-like shaped tube, which may be formed by molding. The barrier 116 is substantially sealed to one of the filters, such that no or minimal bypass of the barrier is allowed. As shown, the barrier is sealed to the second stage media member 114 at area 134, and cooperatively sealed with the outer filter through seal 150. In the embodiment shown, the spiraled flange 118 is close to/in contact with the inner diameter of the outer filter, which provides support for the outer filter. In some embodiments, about a 0.5 mm clearance or tolerance is between the barrier 116 and the outer filter, so as to prevent stack up and damage to the media 112.

In the embodiment shown, spacing between ribs of the spiraled flange 118 is arranged such that coalesced water or water droplets can be accommodated during fluid flow around and through the barrier 116. In one embodiment, the spacing is approximately 0.25 to 0.75 inches between the spiral ribs or portions.

In the embodiment shown, the second media 126 can represent a hydrophobic screen as the "second stage" media. As shown, the second media 126 is at openings of the inner filter and below the main body 128. The second media 126 provides additional particulate filtration and water separation, allowing fuel to pass. Water and water droplets drain from the cartridge and are not intended to pass through the second media 126. Spacers 142 are shown at the bottom of the inner filter, which allow for water to drain out of the cartridge 100 at water drainage opening 140.

One key of the cartridge 100 is that, for example at certain flow rates, the barrier 116 is used between the two media stages 112, 126, where the spiraled flange 118 of the barrier 116 (e.g. tube) helps to further separate coalesced water from the fuel before reaching the second media 126.

Figure 7:
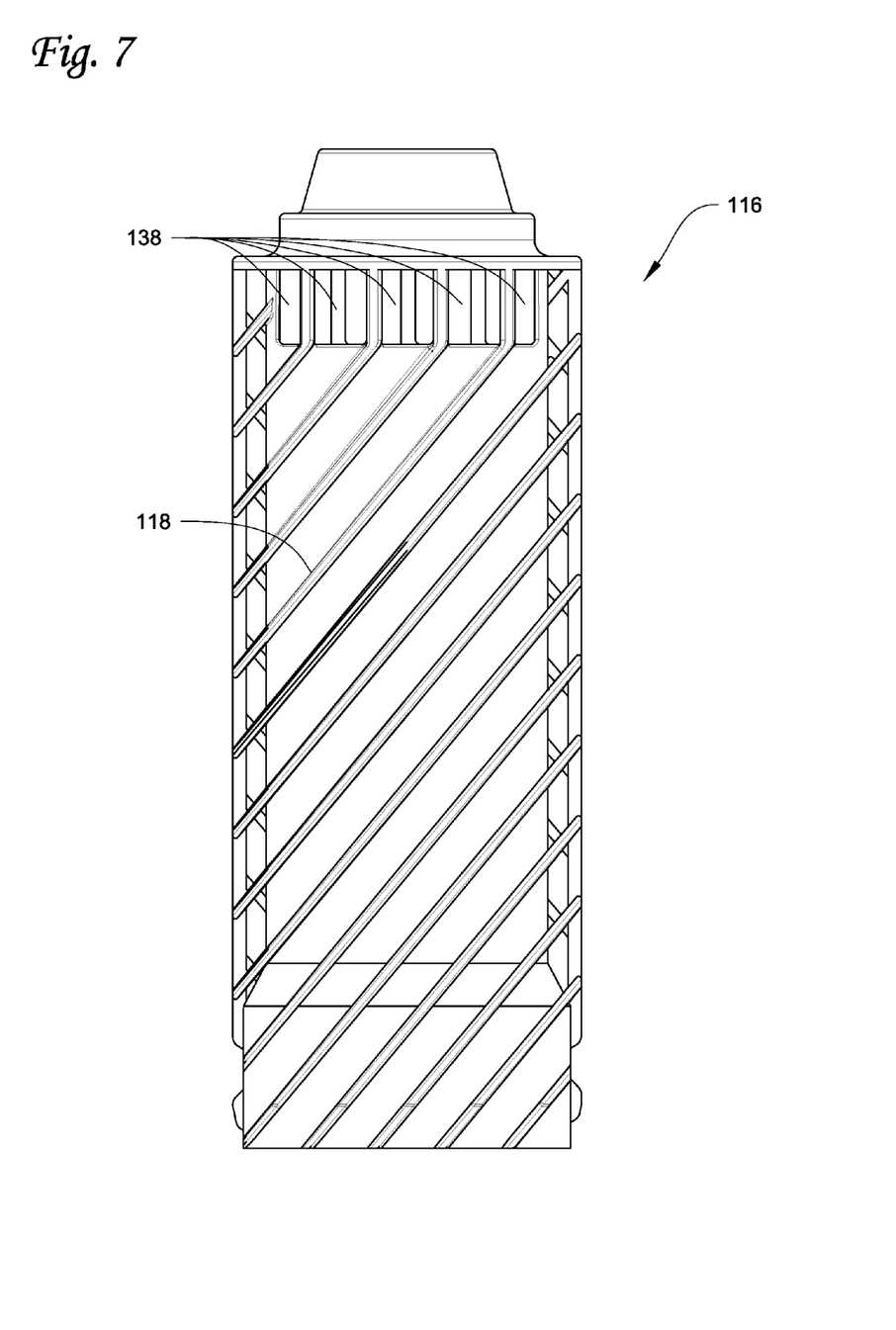
FIG. 7 is a side view of the barrier of FIG. 4.
Figure 8:
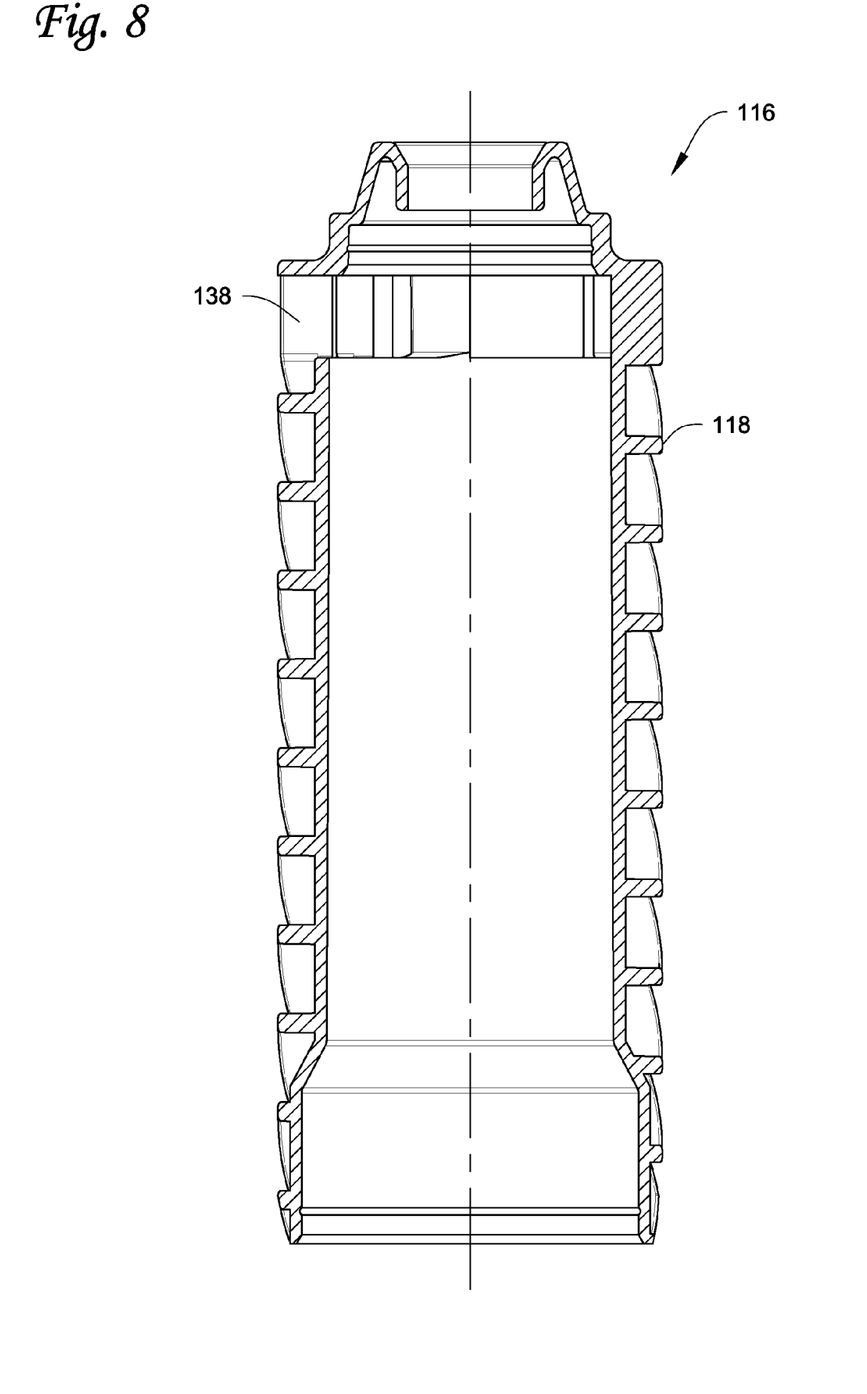
FIG. 8 is a sectional view of the barrier of FIG. 4.
Figure 9:
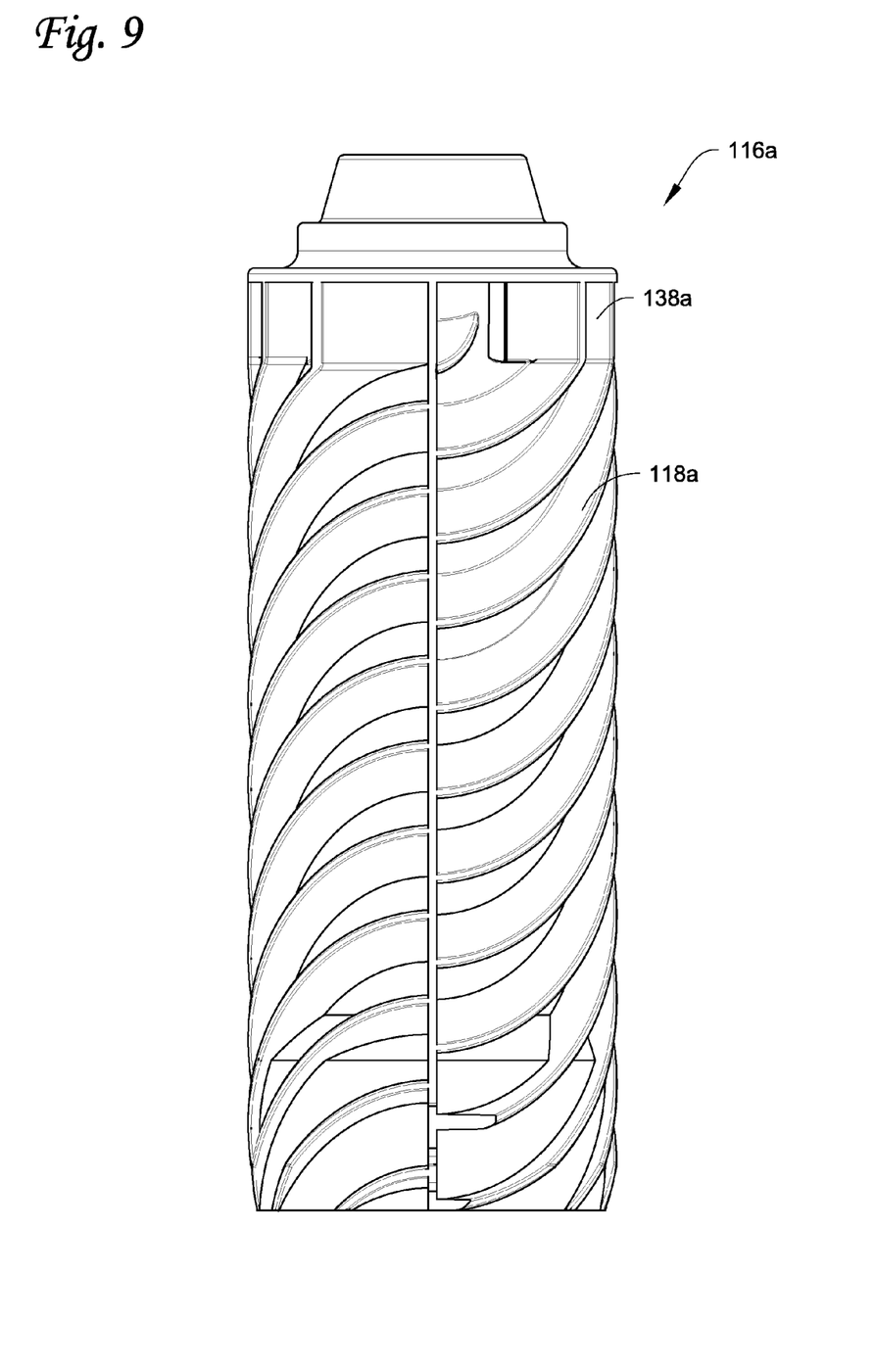
FIG. 9 is another embodiment of a barrier, which may be used in the filter cartridges herein, for example the filter cartridge of FIG. 3.
Figure 10:
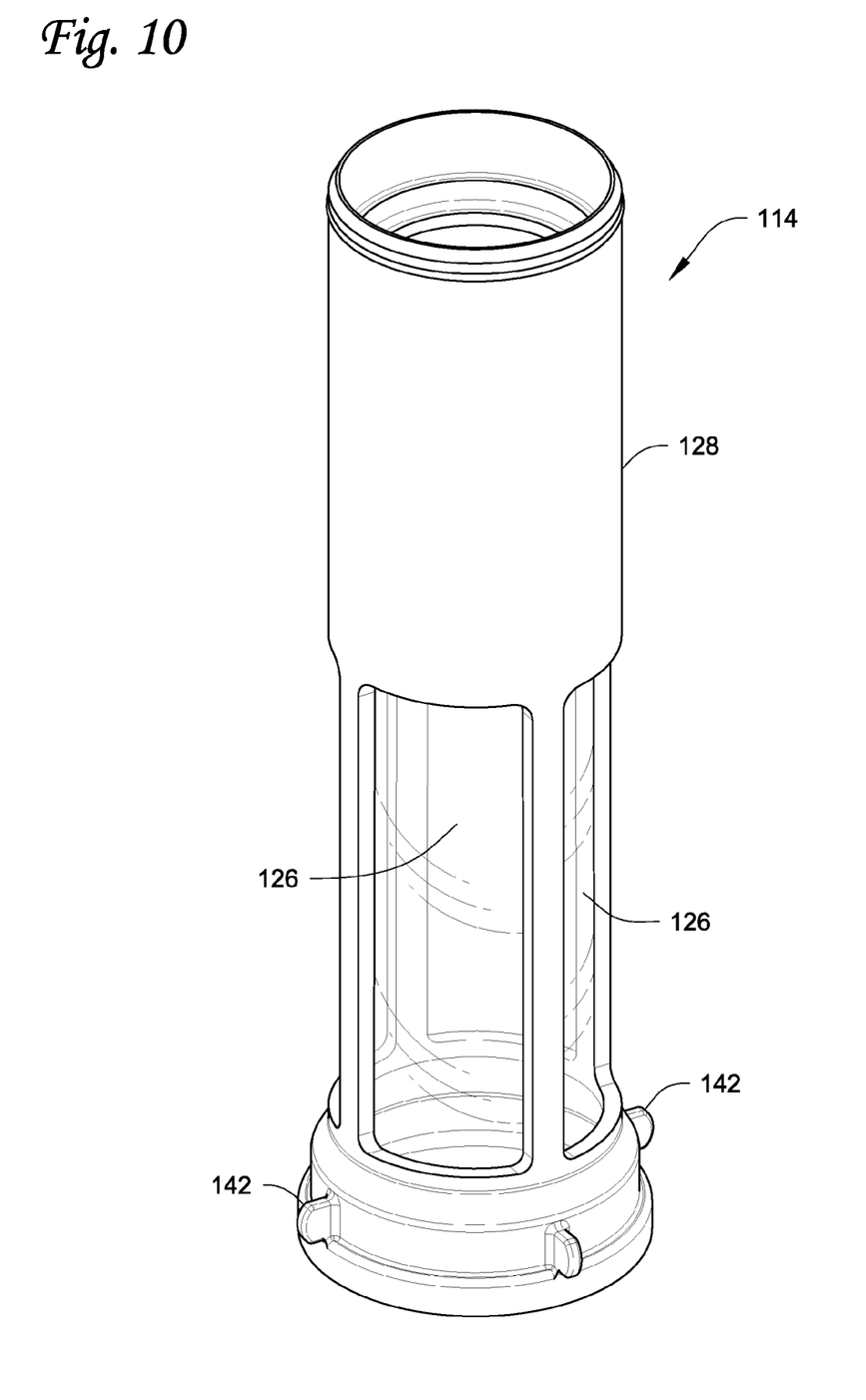
FIG. 10 is a perspective view of one embodiment of a second stage media member of the dual stage media of FIG. 3.
Figure 11:
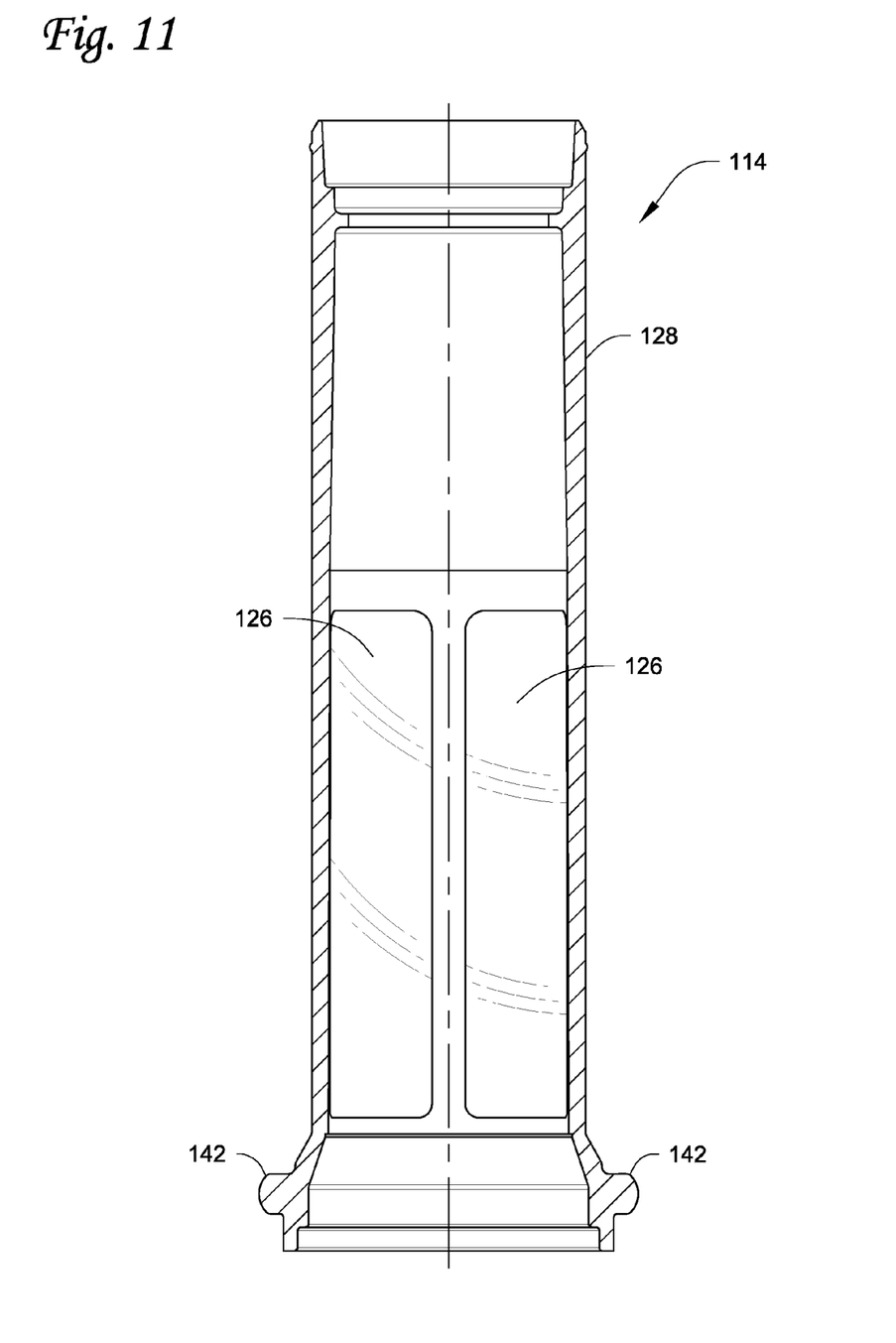
FIG. 11 is a sectional view of the second stage media member of FIG. 10.

With reference to FIG. 9, another embodiment of a barrier 116a is shown. Similar to barrier 116, barrier 116a also includes a spiraled flange 118a and top openings 138a. The difference is the particular geometry of the spiraled flange 118a, which is less linear and more wave-like. It will be appreciated that the particular geometry of the spiraled flange may vary as appropriate, and the spiraled flanges 118, 118a, for example in FIGS. 7 and 9 are merely exemplary.

Figure 12:
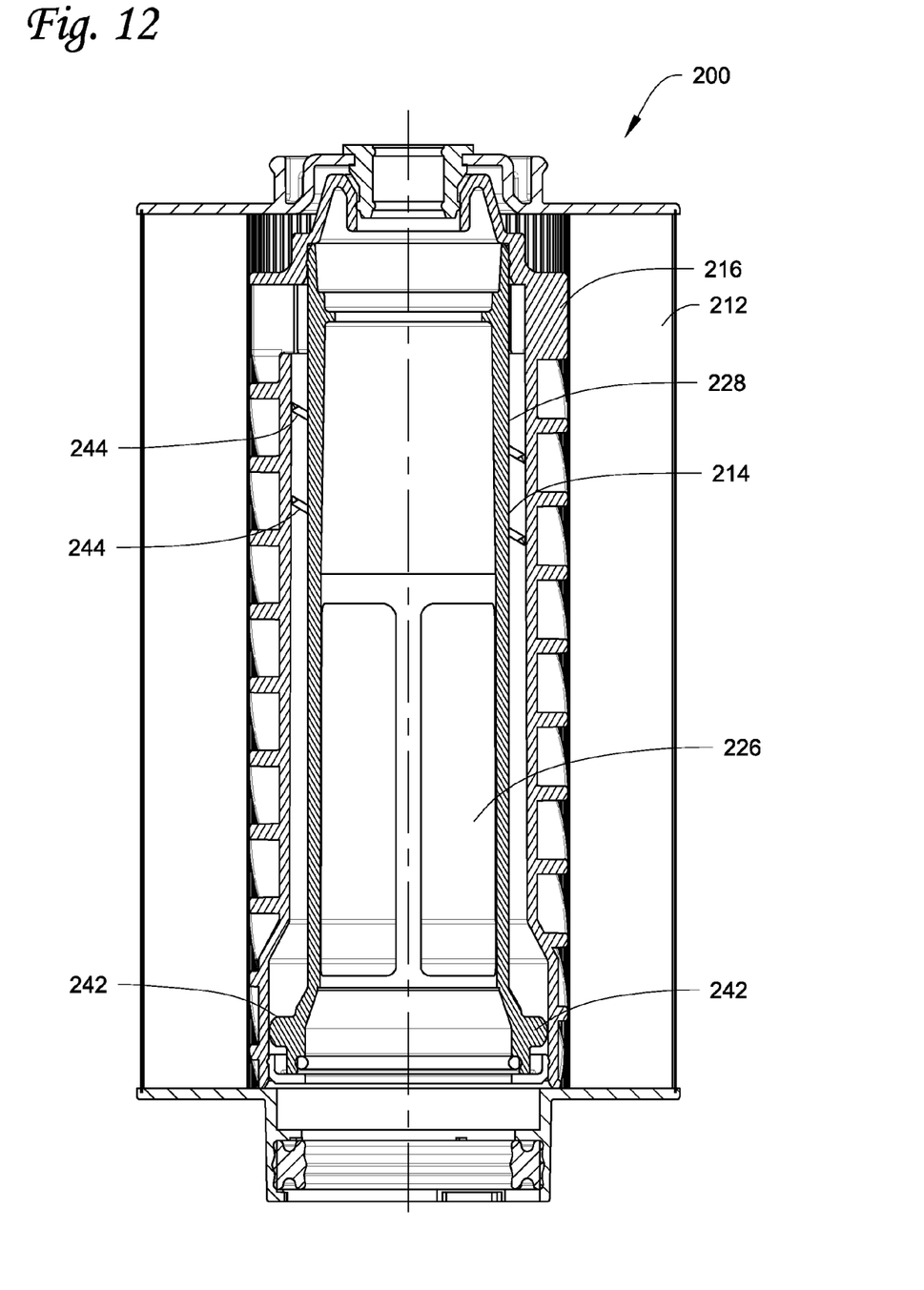
FIG. 12 is a sectional view of another embodiment of filter cartridge having dual stage media filtration and showing a barrier that directs fluid flow between dual stage media.
Figure 13:
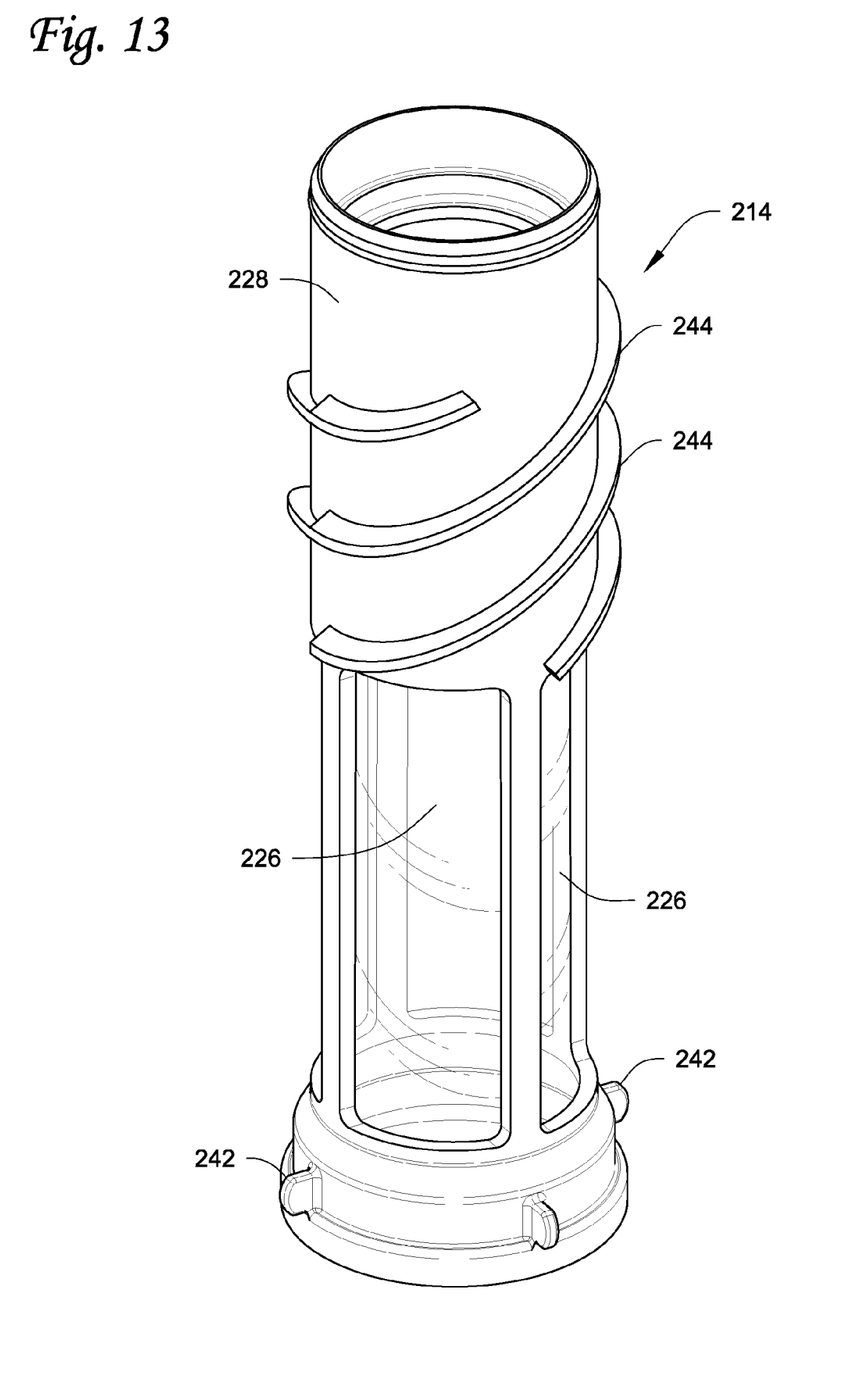
FIG. 13 is a perspective view of another embodiment of a second stage media member and showing an additional flow assist element.
Figure 14:
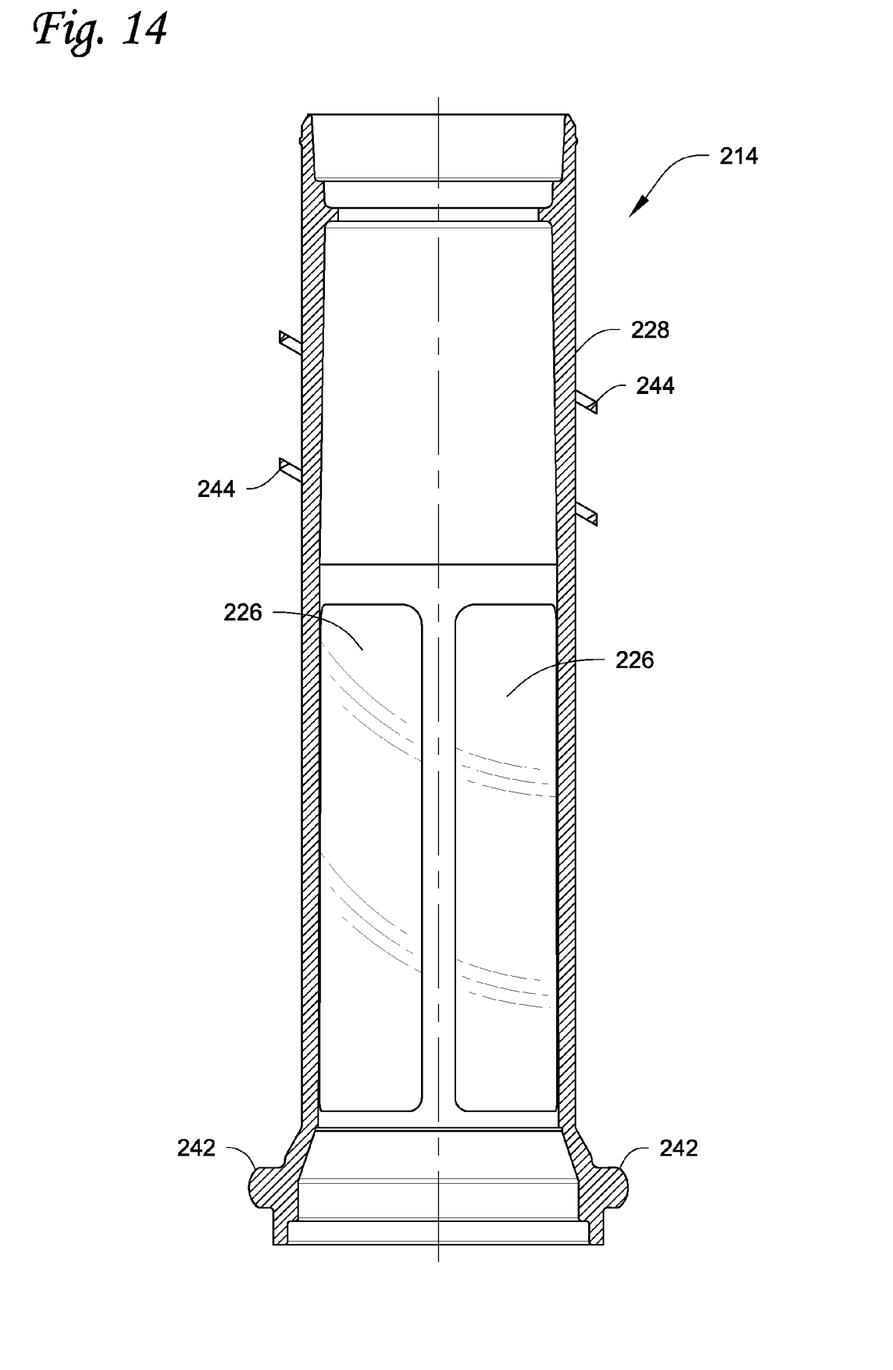
FIG. 14 is a sectional view of the second stage media member, showing the additional flow assist element.

With reference to FIGS. 12-14, another embodiment of a filter cartridge 200 is shown. Generally, the filter cartridge 200 includes a structure where the inner filter or second stage media member 214 includes an additional barrier portion 228 above the second media having another spiraled flange 244. The spiraled flange 244 is disposed on an outer surface of the additional barrier portion 228. The spiraled flange 244 faces an inner diameter of the barrier 216.

With reference to the general structure of dual stage filter cartridge 200, many structures as employed in filter cartridge 100 are similar to filter cartridge 200, and such features are not further described. Generally, filter cartridge 200 includes an outer filter having the first media 212 and the inner filter or second stage media member 214 with a main body or 228 and a second media 226. As shown, the second stage media member 214 is disposed within the outer filter, and the filters can be arranged in a concentric filter in filter arrangement, such as known. The main body 228 acts as an additional barrier portion, but where an additional spiraled flange 244 is used to further facilitate water separation from fuel. Similar to filter cartridge 100, spacers 242 are used to allow water to drain from the cartridge 200.

With further reference to the spiraled flange 244, FIGS. 12-14 show an embodiment of a combination of a barrier 216 with an assisting spiraled flange directing flow upward, and another barrier assist spiraled flange 244 directing flow downward. The filter cartridge 200 provides two devices to generate a dual swirl effect.

Such a configuration may be useful, for example at high flow rates. Use of the barrier 216 between the two media stages 212, 226 may not always be sufficient, as there may be a need to make water and water droplets move as far as possible from second media 226, e.g. hydrophobic screen. The design of FIGS. 12-14 provides two stages of swirl effect, (1) on the barrier tube 216 through flange 218, and (2) on the hydrophobic screen body 228 through flange 244.

The swirl effect, for example from flange 244, provides centrifugal movement that allows for water to be drained as far as possible from the hydrophobic screen (e.g. second media 226), so that water and water droplets are less in contact with the screen. That is, the centrifugal force created by the swirl effect moves water and water droplets away from second stage media member 214, i.e. away from the second media 226.

With further reference to the filter cartridge 100 of FIGS. 3-11, the following are some data from test results on fuel water separation efficiency and differential pressure.

Fuel Water Separation Tests

Flow rates can be achieved, for example, at about 20 L/min, where the first media element had a pleat count of about 80, pleat depth of about 22 mm, slit width of about 184.8, media area of about 0.650 m$^2$, and a face velocity of about 30.7 L/min·m$^2$, and where the second media element had a media area of about 0.0076 m$^2$, and face velocity of about 2631.6 L/min·m$^2$.

Flow rates can be achieved, for example, at about 14.35 L/min, where the first media element had a pleat count of about 80, pleat depth of about 22 mm, slit width of about 132.9.8, media area of about 0.468 m$^2$, and a face velocity of about 30.7 L/min·m$^2$, and where the second media element had a media area of about 0.005 m$^2$, and face velocity of about 2870.0 L/min·m$^2$.

Fuel water separation efficiency tests showed from about 91.1% to about 97.1% efficiency, under test conditions using emulsified water 0.25%, with droplet sizes of about 5-10 μm, and at interfacial tension (IFT) of about 28 mN/m, subject to 150 minutes using a valve fitted at the water outlet to ensure a flow of 0.1 L/min. Tests were performed at both typical production design equivalent flow density and higher flow rates than what the cartridge would typically see during use.

According to certain standards, for example ISO TS 16332 for diesel engine fuel filters, high efficiencies can be obtained, for example at about 96% at a flow rate of about at about 87% at a flow rate of about 17 L/min, and at about 78% at a flow rate of about 20 L/min. Such tests were performed under conditions using emulsified water 0.15%, a reference fuel CEC RF 06 03 from Total with Hitec, and at an interfacial tension (IFT) of about 16 to 19 mN/m, at a duration of about 90 minutes using a valve fitted at the water outlet to ensure a flow of 0.1 L/min, with droplet sizes of about 60 μm.

Differential Pressure ΔP Tests

Depending on the particular combination of media used for the first and second media, differential pressure results ranged from 0-10 kPa and 0-8 kPa, depending on the flow rate. For example, differential pressures showed 0, 5, 7, 8, 9, and 10 kPa at respective flow rates of 0, 300, 540, 720, 840, and 960 (l/h). In another example using a different media, differential pressures showed 0, 3, 5, 6, 7, and 8 kPa at respective flow rates of 0, 300, 540, 720, 840, and 960 (l/h).

In other examples, lower differential pressures can be obtained using the cartridge design 100. For example, flows of 14 L/min can be obtained at flow rates of 840 (l/h) with a differential pressure of 9 kPa. Across various flow rates of 0, 300, 540, 600, 720, 840, 900, 960, and 1200 (l/h), kPa results were 0, 5, 7, 7.5, 8, 9, 9.5, 10, and 12, respectively.

The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A filter comprising:
   an outer filter having a first media, the first media being a coalescer that causes water to separate from a working fluid;
   an inner filter having a second media; and
   a barrier disposed between the first media and the second media, the barrier including a wall that extends below the outer filter,
   the barrier is sealed to a top end plate and configured to direct fluid flow between the first and second media,
   the barrier configured to create a flow path between the first and second media, such that a working fluid, which is desired to pass through the first and second media, is directed by the barrier and flows downward along an outer surface of the barrier towards the bottom of the barrier after the working fluid has passed through the first media, flows upward towards the second media and then flows through the second media, and such that water, which is not desired to pass through the second media, is directed by the barrier and separates from the working fluid,
   wherein the barrier includes a wall that (1) is continuous with the barrier and (2) flares toward and below the outer filter.

2. The filter of claim 1, wherein the outer filter and the inner filter are arranged as a cartridge structure, where the inner filter is disposed within the outer filter in a concentric filter in filter arrangement.

3. The filter of claim 1, wherein the barrier is textured on a surface of the barrier facing the outer filter.

4. The filter of claim 1, wherein the barrier includes a spiraling flange disposed on a surface of the barrier facing the outer filter.

5. The filter of claim 4, wherein the spiraling flange contacts an inner diameter of the outer filter and supports the outer filter.

6. The filter of claim 4, wherein the spiraling flange includes a space of approximately 0.25 to 0.75 inches between spiral portions.

7. The filter of claim 4, wherein the spiraling flange is a component separately assembled onto the outer surface of the barrier, the spiraling flange having a shape that resembles a wound spring.

8. The filter of claim 1, wherein the barrier is constructed as a permanent and reusable element, where the barrier is mountable to a filter housing, and extends upward between the inner and outer filters.

9. The filter of claim 1, wherein the barrier includes one or more of at least one hydrophobic portion, at least one hydrophilic portion, and nano-bumps disposed on a surface of the barrier facing the outer filter.

10. The filter of claim 1, further comprising another media disposed within a gap between the outer filter and barrier, the another media located proximate a bottom of the outer filter, wherein the another media is different from the first media and the second media.

11. The filter of claim 1, further comprising another media disposed within a gap between the barrier and the inner filter, the another media located proximate a bottom of the inner filter, wherein the another media is different from the first media and the second media.

12. The filter of claim 1, wherein the outer filter has an additional media disposed on an outer diameter of a bottom endplate, the media configured to separate an undesired fluid from a desired fluid that, wherein the undesired fluid does not pass through the outer filter.

13. The filter of claim 1, wherein the inner filter includes a hydrophobic media as the second media.

14. The filter of claim 1, wherein the inner filter includes an additional barrier portion above the second media.

15. The filter of claim 14, wherein the additional barrier portion includes a spiraling flange disposed on an outer surface thereof, the spiraling flange facing an inner diameter of the barrier.

16. A method of separating water from fuel in a filter in accordance with claim 1, comprising:
   moving a mixture including fuel and water through the first media;
   contacting the mixture against the barrier;
   directing the mixture around the barrier, such that directing includes changing a direction of flow of the mixture, thereby separating water from fuel;
   moving the mixture to the second media; and
   stripping additional water that may be present in the mixture.

* * * * *